United States Patent [19]
Baxter et al.

[11] Patent Number: 5,937,887
[45] Date of Patent: Aug. 17, 1999

[54] METHOD OF ASSEMBLING ELECTROMAGNETICALLY ACTUATED DISC-TYPE VALVE

[75] Inventors: Randy C. Baxter; David R. Gallup, both of Taylors; H. A. Staples, III, Greer, all of S.C.

[73] Assignee: Sagem Inc., Greenville, S.C.

[21] Appl. No.: 08/808,946

[22] Filed: Feb. 19, 1997

Related U.S. Application Data

[62] Division of application No. 08/466,472, Jun. 6, 1995, Pat. No. 5,692,723.

[51] Int. Cl.⁶ .............................. F16K 43/00; F16K 31/06
[52] U.S. Cl. ........................... 137/15; 137/550; 210/429; 210/432; 239/575; 239/585.3; 251/129.16; 251/129.21
[58] Field of Search .............................. 137/15, 550, 549, 137/315; 251/129.16, 129.21; 239/585.1, 585.2, 585.3, 585.4, 585.5, 600, 575, 900; 210/429, 432; 29/213.1, 729, 762

[56] References Cited

U.S. PATENT DOCUMENTS

| | | |
|---|---|---|
| 4,655,396 | 4/1987 | Taxon et al. ..................... 251/129.16 |
| 4,787,418 | 11/1988 | Chute ................................. 251/129.21 |
| 4,909,447 | 3/1990 | Gallup et al. ....................... 251/129.16 |
| 4,941,447 | 7/1990 | Mannhardt ......................... 251/129.16 |
| 5,054,691 | 10/1991 | Huang et al. ....................... 251/129.16 |
| 5,340,032 | 8/1994 | Stegmaier et al. ................. 251/129.21 |
| 5,348,232 | 9/1994 | Babitzka et al. ................... 251/129.21 |
| 5,372,313 | 12/1994 | Chabon et al. ..................... 251/129.16 |
| 5,381,965 | 1/1995 | Chabon et al. ..................... 251/129.16 |
| 5,381,966 | 1/1995 | Gernert, II ......................... 251/129.16 |

*Primary Examiner*—George L. Walton
*Attorney, Agent, or Firm*—Dority & Manning, P.A.

[57] ABSTRACT

A method of assembling an electromagnetically actuatable disc-type valve permits separate assembly of the hydraulic components from the electrical components. The constant shape of the exterior surface of the core member enables the hydraulic sub-assembly to be assembled separately from the electrical sub-assembly and thereafter inserted into the electrical sub-assembly. The valve's plastic covering is applied to the electrical components separately and before the hydraulic components are assembled with the electrical components. In this way, the heat involved does not affect the calibration of the hydraulic components. A bushing is disposed to lock the two sub-assemblies at the desired relative orientation. The fluid filter is inserted into the valve before the calibration slide is inserted into the valve. The valve is flow checked before setting the tension on the armature of the valve.

11 Claims, 12 Drawing Sheets

METHOD OF ASSEMBLING ELECTROMAGNETICALLY ACTUATED DISC-TYPE VALVE

This is a division of application Ser. No. 08/466,472 filed Jun. 6, 1995, now U.S. Pat. No. 5,692,723.

BACKGROUND OF THE INVENTION

The present invention relates to electromagnetically actuated valves and more particularly to such valves of the disc type.

In a gasoline engine, the standard fuel injector port in the air manifold has a diameter of 14 mm. Disc-type gasoline fuel injectors are known and typically involve a double working pole magnetic circuit. In order to house the structures forming the magnetic circuit and the fuel path of the conventional disc-type injector, the main body portion of the disc-type injector requires a relatively large diameter and cannot be inserted into the standard port. This limits the ability of engine designers in their designs of the air manifold and air inlet. A disc-type gasoline fuel injector is disclosed in U.S. Pat. No. 4,917,307 to Baxter et al. A hollow generally cylindrical outer body 11 formed of magnetic material surrounds a hollow flanged core member 13, also formed of magnetic material. A former 16 made of synthetic resin material surrounds core 13, and a solenoid winding 17 is wound around former 16. Body 11 defines an integral radially inwardly extending annular shoulder 18. An annulus 19 is trapped against annular shoulder 18 by means of a non-magnetic valve seat member 21, which itself is held in position by means of a tubular outlet member 15 which projects into the air inlet manifold of the gasoline engine. Seat member 21 is configured in the form of a disc, the diameter of which is equal to the internal diameter of body 11. Seat member 21 has a central orifice 22, which is surrounded by an inner annular seat element 23. A plate valve member 24 is biased by a spring 26 into contact with inner annular seat element 23, which is disposed within annulus 19. The valve is checked for flow while the tension in spring 26 against valve member 24 is set by staking the calibration slide into the position that yields the desired flow. Then the filter is inserted into the inlet 12 of the body 11. Valve member 24 has a plurality of openings 25 and is formed of magnetic material so that when winding 17 is energized, the flange 18 and core member 13 assume opposite magnetic polarity. The valve member 24 is attracted away from the seat element 21 against the biasing action of the spring 26 so that fuel can flow through the passage 14 and openings 25 to the central orifice 22. Movement of the valve member 24 towards the annular shoulder 18 is limited by a non-magnetic shim (not shown).

In valves of this type, critical dimensions such as the air gap typically are set during manufacture by grading shims or the thickness of other components. For example, non-magnetic plates may be inserted on one or both of a moving magnetic pole and a stationary magnetic pole.

One attempt at providing a fuel injector of very small size and very simple structure that can be produced at low cost is disclosed in published European patent application publication number 0 536 774 A1 to Babitzka et al. In this bucket-type injector, the body 1 houses an annular electromagnet 2 in which a tubular core 3 is disposed. The shutter member 4 is fixed to an armature 6 that can be magnetically attracted to the tubular core. The injection orifice 5 is formed in an element 8 that is configured with a flat bottom wall that is laser welded to the lower section of an annular wall 7, which is configured with two concentric sections of different diameters. The lower section 9 of the annular wall 7 has a relatively smaller diameter than an upper section 10 of the annular wall 7. A sealing ring 13 and a spacer washer 14 are disposed between the tubular core 3 and the upper section 10 of the annular wall of the annular ferromagnetic element 7 that partially houses the lower end of the core and partially houses the sealing ring. A tubular casing 15 formed of sheet metal contains the annular ferromagnetic element 7 and the tubular core, and the lower end of the casing 15 overlies at least a part of the annular wall 10 of the annular ferromagnetic element 7 and is fixed to the annular wall 10 of the annular ferromagnetic element 7 by means of a laser weld 19. A further laser weld 21 attaches the opposite end of the casing 15 to a flange 20 formed in the opposite end of the core. A magnetic circuit with a single working-pole is formed within the core 3, the armature 6, and the wall 10 of the ferromagnetic element 7. However, bucket-type injectors, while typically having a magnetic circuit with a single working-pole, are noisier and more prone to leakage than disc-type injectors.

OBJECTS AND SUMMARY OF THE INVENTION

It is a principal object of the present invention to provide an electromagnetically actuated disc-type valve having a substantially reduced moving mass and superior noise reduction and sealing performance.

It is still another principal object of the present invention to provide an electromagnetically actuated disc-type valve that does not rely on internally disposed O-rings for sealing.

It is another principal object of the present invention to provide an electromagnetically actuated disc-type valve having a substantially reduced diameter without sacrificing performance of the valve.

It also is a principal object of the present invention to provide an electromagnetically actuated disc-type valve having a reduced diameter while achieving improved performance over larger diameter valves.

It is yet a further principal object of the present invention to provide an electromagnetically actuated disc-type valve with a reduced diameter armature that is relatively thick yet avoids jamming in use.

It is a further principal object of the present invention to provide a disc-type, gasoline fuel injector having a reduced diameter to permit greater latitude to designers of the air manifold of the gasoline engine.

It is another principal object of the present invention to provide a disc-type, gasoline fuel injector having a reduced diameter that permits insertion of a greater depth of the injector into the injector port of the air manifold of the gasoline engine than is possible with conventional injectors.

It is another principal object of the present invention to provide an improved electromagnetically actuated disc-type valve having a magnetic circuit with a single working pole.

It is yet another principal object of the present invention to provide an electromagnetically actuated disc-type valve having a reduced diameter relative to conventional disc-type valves yet having a magnetic circuit with a single working pole.

It is still another principal object of the present invention to provide an electromagnetically actuated disc-type valve having a reduced diameter while lending itself to simpler construction and less expensive manufacturing techniques.

It is yet another principal object of the present invention to provide an electromagnetically actuated disc-type valve that can be fabricated with fewer machining operations.

It is yet another principal object of the present invention to provide an electromagnetically actuated disc-type valve that is configured so that during manufacture the valve can be checked for leakage, static flow rate and armature lift before adding the electrical sub-assembly.

It is still another principal object of the present invention to provide an electromagnetically actuated disc-type valve that can be calibrated for spring tension with the fluid filter already installed.

It is a further principal object of the present invention to provide an electromagnetically actuated disc-type valve having a hydraulic sub-assembly that is hermetically sealed and separate from the electrical sub-assembly of the valve.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the disc-type valve of the present invention includes a magnetic circuit with a single working pole, which is more efficient than a double working pole circuit that normally is associated with a disc-type fuel injector embodiment of a disc-type valve. In the single pole magnetic circuit of the present invention, the magnetic flux travels through the body, the body flange, the core member, the armature, the magnetic pole, and the nozzle, each of which being formed of magnetic material. However, a guide ring formed of non-magnetic material and having a smaller interior diameter than the interior diameter of the magnetic pole, prevents physical contact between the armature and the magnetic pole. Similarly, the lift stop member is also formed of non-magnetic material and is disposed to prevent contact between the armature and the core. The thickness of the guide ring is configured in relation to the exterior diameter of the armature, the amount of lift permitted the armature between the lift stop member and the top surface of the valve seat, and the diametrical clearance between the central opening of the guide ring and the armature, so as to preclude jamming of the armature against movement. The valve's configuration enables the diameter of the valve body to be kept below 13.5 mm.

The lift stop is welded to the core and welded to the nozzle. The combination of these welds, and others described below, hermetically seal the valve and prevent leakage of the fluid during operation of the valve. As known, the desired air gap between the bottom surface of the core member and the armature needs to be precisely controlled. In the present invention, the welding of the lift stop member to the exterior surface of the core member can be performed so as to provide the direct control needed to set the air gap with the required accuracy.

The design of the present invention simplifies the assembly of the valve. The configuration of the valve of the present invention permits the valve to be hermetically sealed by welding. Because the welding hermetically seals the hydraulic sub-assembly of the valve, the hydraulic sub-assembly comprising the core, the armature, the lift stop, the guide ring, the magnetic pole, the valve seat, and the nozzle, can be assembled separately from the electrical sub-assembly comprising the body, the coil, and the plastic jacket covering the body. The nozzle and valve seat are configured so that they can be welded to one another without affecting the integrity of the seating of the armature on the sealing land of the valve seat. In one alternative embodiment of the armature, the plenum has an angled base for receiving the spring to ensure that the armature moves in a consistent and repeatable manner. A top bushing connects the hydraulic sub-assembly to the electrical sub-assembly of the valve and enables the distinguishing features of the electrical sub-assembly of the valve to be oriented with respect to the distinguishing features of the hydraulic sub-assembly of the valve before the top bushing is welded into place to fix these relative orientations of the two sub-assemblies relative to one another.

Additionally, because the valve's hydraulic sub-assembly is a separately sealed unit, the hydraulic sub-assembly can be independently checked for such things as lift, leakage, and static flow rate before the hydraulic sub-assembly is added to the electrical sub-assembly.

Moreover, the valve's plastic jacket is molded around the body of the electrical sub-assembly before the hydraulic sub-assembly is combined with the electrical sub-assembly. In this way, the hydraulic sub-assembly is not subjected to the heat stresses and pressure stresses that otherwise would occur when the plastic jacket is molded to the body. By thus being shielded from such stresses, the reliability of the aforementioned testing of the hydraulic sub-assembly is maintained. In addition, since the valve's filter is inserted into the core before the calibration slide is inserted to set the biasing force on the armature, the flow testing of the valve can occur in the presence of the filter, thus enhancing the reliability of the flow testing of the hydraulic sub-assembly.

The manufacture of the valve of the present invention can be accomplished with very few machining operations. This is possible because the core can be formed of a piece of tubing, as can the magnetic pole, and the body of the injector. Moreover, both the lift stop and the guide ring can be formed of a fine blanked component. Furthermore, the armature can be molded, and only a small amount of secondary machining would be required to finish the outer surfaces of the armature. In one alternative embodiment of the armature, the plenum has a groove in its base that is capable of receiving a spring with an unfinished end at reduced cost without sacrificing consistent and repeatable biaising of the armature by such spring.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
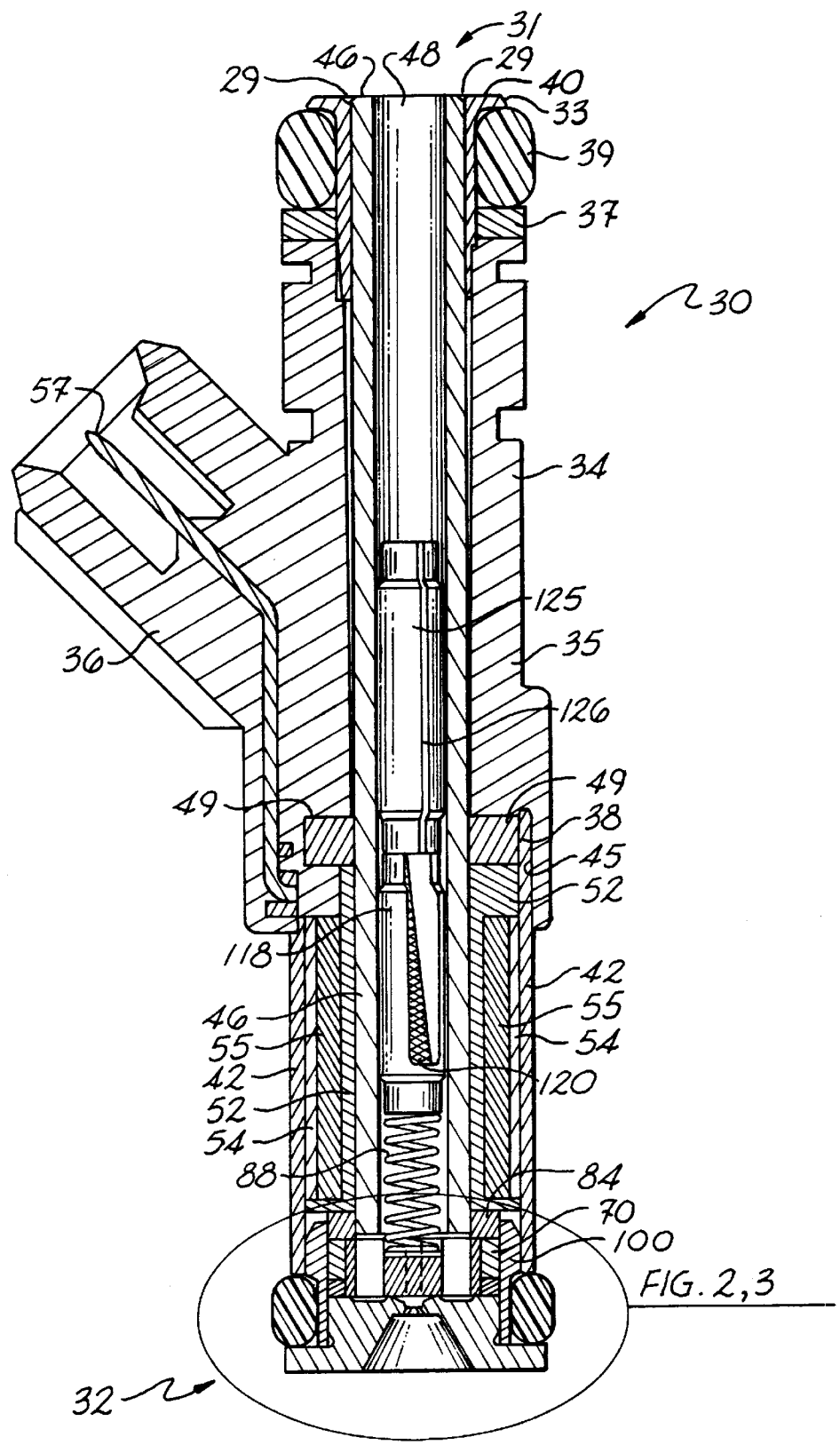
FIG. 1 is a longitudinal cross-sectional view of a preferred embodiment of assembled components of a valve in accordance with the present invention.

A preferred embodiment of the electromagnetically actuatable disc-type valve of the present invention is shown in FIG. 1 and is represented generally by the numeral 30. The valve can be used for any of a number of applications. For example, the valve can be used as a gasoline fuel injector for supplying liquid fuel to an air inlet duct of a spark ignition engine. For purposes of illustrating the structure and function of the valve of the present invention, the preferred embodiments described below and shown in the Figs. are in the form of gasoline fuel injectors.

In general, the electromagnetically actuated disc-type valve of the present invention can be regarded as having two opposite ends, a receiving end (indicated generally in FIG. 1 by the numeral 31) and a delivery end (indicated generally in FIG. 1 by the numeral 32). In the gasoline injector embodiment, the receiving end is generally disposed externally of the engine and provides connecting sites for attachment to electrical and fuel inputs for the injector. As shown in FIG. 1, the receiving end of the valve consists largely of a plastic jacket 34 formed by a molded plastic component having two branches, a main branch 35 and an auxiliary branch 36. The main branch has two opposite ends. One end of the valve's main branch houses the connection to the fluid supply for the valve and can include an O-ring 39 and a top bushing 40. Some embodiments of the valve can include a color ring 37, but it is not a necessity. However, when provided, color ring 37 is color-coded to enable easy identification of the type of valve. Top bushing 40 is provided with an end flange 33 that cooperates with plastic jacket 34 or color ring 37 (when provided) to form a groove for receiving O-ring 39.

The delivery end 32 of the main branch 35 is configured to contain the components of the valve that deliver the fluid in a metered flow. In the injector embodiment, this metered flow of fuel would be delivered to the air intake (not shown) of the engine (not shown). The auxiliary branch 36 of plastic jacket 34 houses an electrical connector for supplying electrical power to the wires of an electrical coil assembly 50 (described below).

Figure 5A:
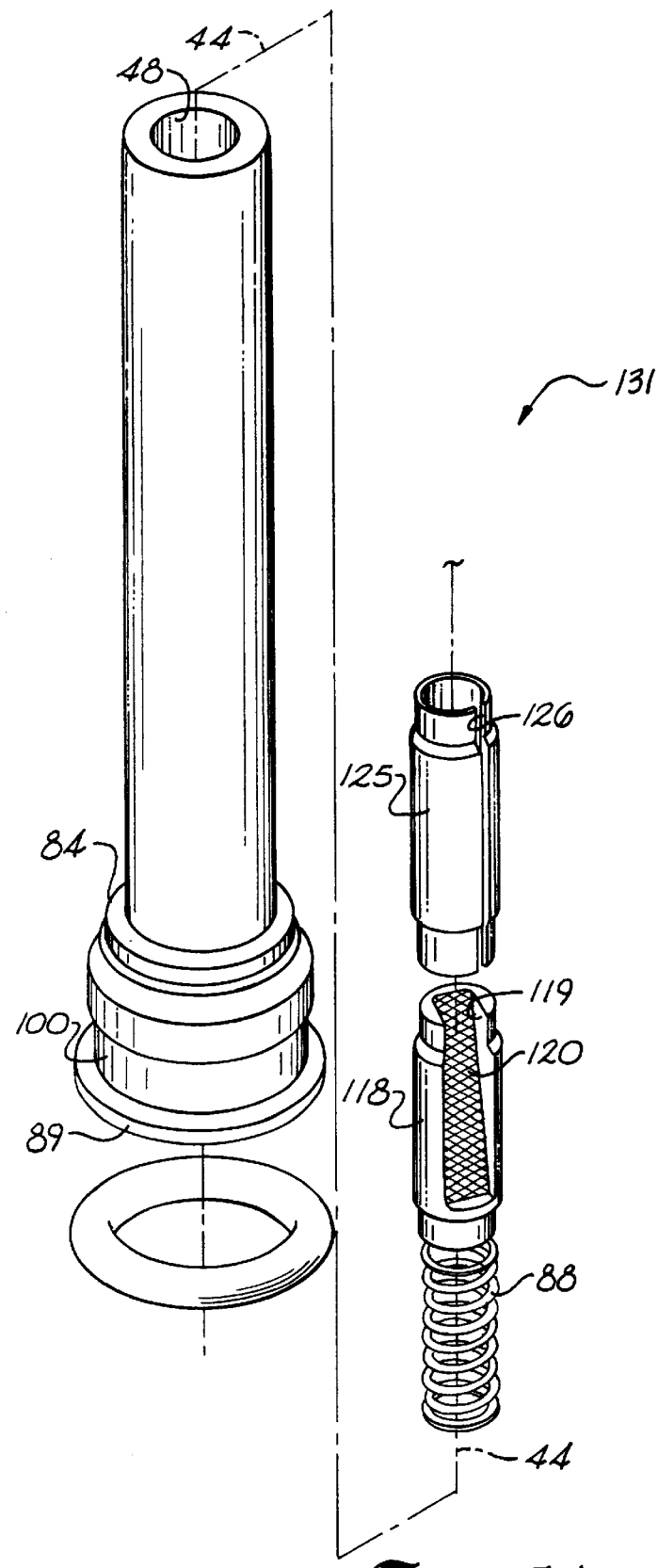
FIG. 5A is an elevated perspective assembly view of an hydraulic sub-assembly of components shown in FIGS. 1 and 4.

In accordance with the electromagnetically actuated disc-type valve of the present invention, two distinct sub-assemblies comprise the valve. As shown in FIG. 5A for example, one sub-assembly is a hydraulic sub-assembly 131, and the other is an electrical sub-assembly 132. Hydraulic sub-assembly 131 includes those components of the valve that pertain to the path taken by fluid through the valve.

In accordance with the electromagnetically actuated disc-type valve of the present invention, a first component of electrical sub-assembly 132 is provided in the form of a body. Referring to FIGS. 1–4, 5B and 6, the valve includes a body 42, which must be formed from magnetic material. In the gasoline fuel injector embodiment, the first external diameter of body 42 typically will not exceed 13.3 mm, which is less than the typical external diameter of the delivery end of a conventional injector.

Figure 4:
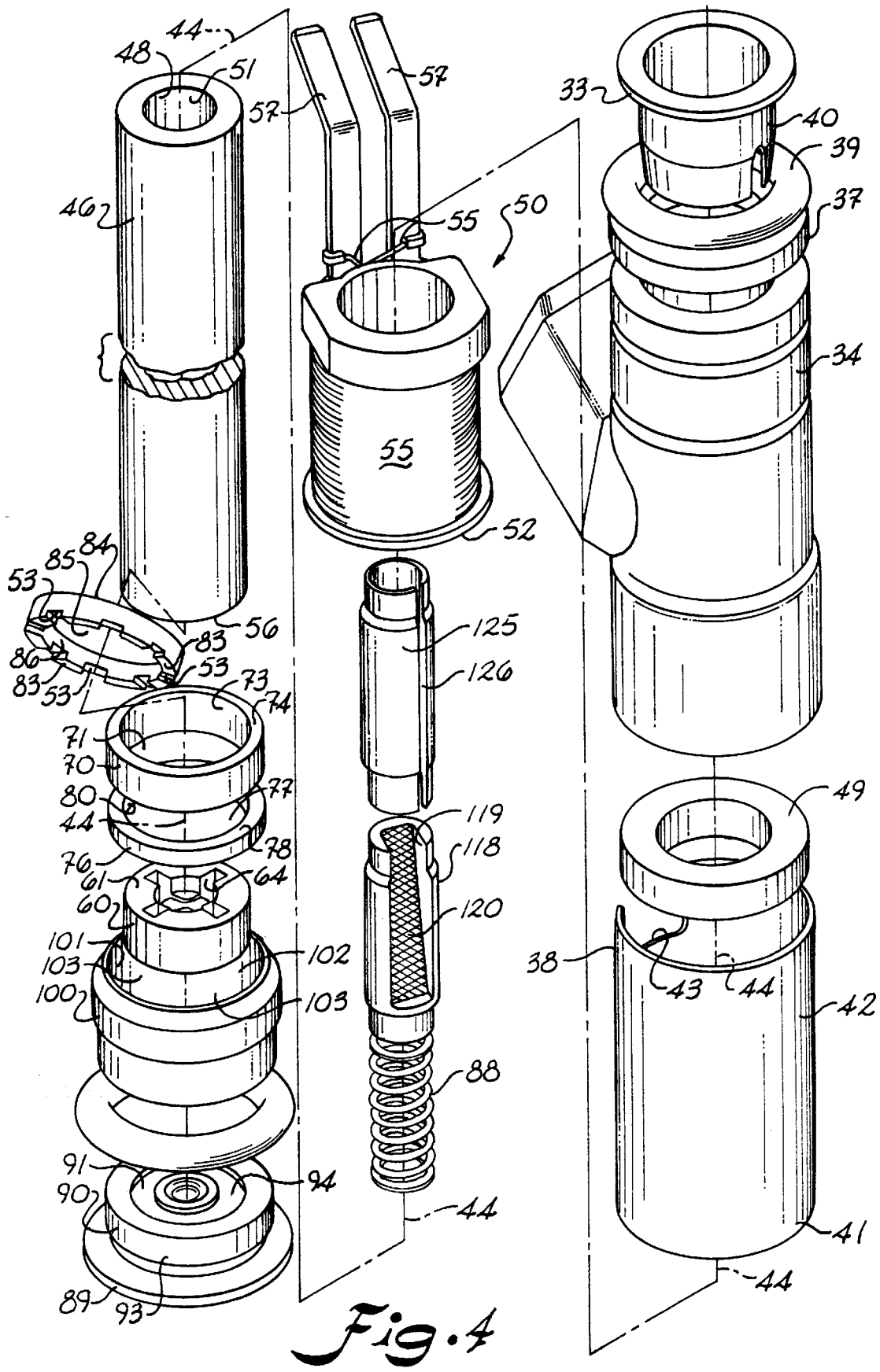
FIG. 4 is an elevated perspective assembly view of the components shown in FIG. 1.
Figure 5B:
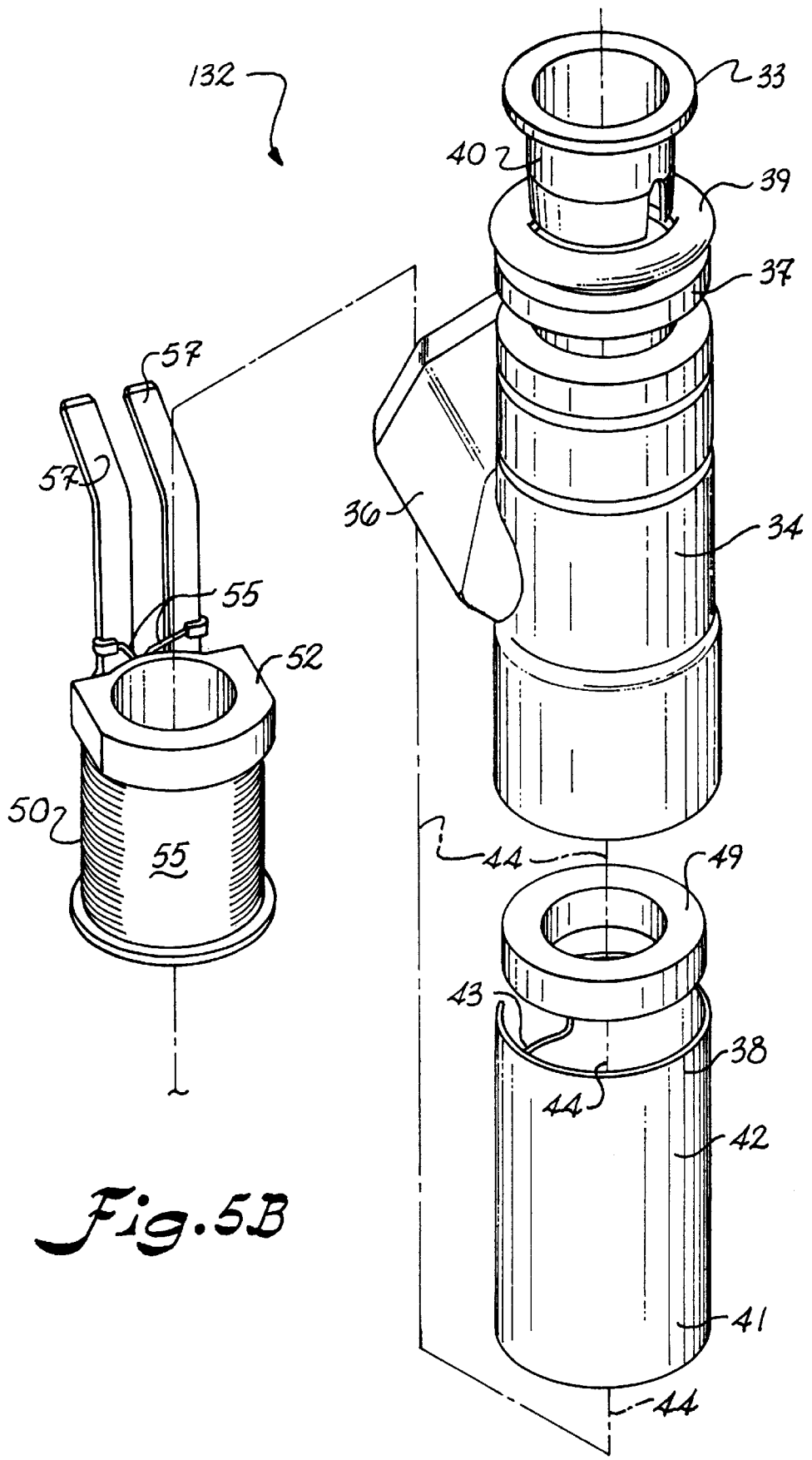
FIG. 5B is an elevated perspective assembly view of an electrical sub-assembly of components shown in FIGS. 1 and 4.

As shown in FIGS. 4 and 5B, body 42 desirably is configured in the form of a cylindrical piece of steel tubing having a circular transverse cross-sectional shape symmetrically disposed about a central longitudinal axis 44. In other words, the exterior surface of body 42 is configured as a right cylinder with a circular transverse cross-section, and the interior surface of body 42 is configured as a right cylinder with a circular transverse cross-section. As such, the cost of manufacturing valve body 42 is minimized. An example of a suitable piece of such tubing has a first internal diameter of 11.6 mm and a first external diameter of 13.2 mm. As shown in FIG. 1, the supply end 38 of body 42 is disposed in an annular recession 45 that is formed in the interior of main branch 35 of plastic jacket 34 when plastic jacket 34 is molded around body 42. As shown in FIG. 4 for example, body 42 has a delivery end 41 disposed opposite supply end 38 of body 42.

The electrical sub-assembly of the electromagnetically actuated disc-type valve of the present invention includes a wire wound into the form of a cylindrical hollow coil for carrying electricity to generate a magnetic field. As shown in FIGS. 1, 4 and 5B, a coil assembly 50 is formed from metal wire 55 that is wound upon a bobbin 52 constructed of electrically insulating material. As shown in FIGS. 4 and 5B, each of the opposite ends of wire 55 is electrically connected to one of terminal blades 57, which also forms part of coil assembly 50. When the valve is in use, the ends of the coil winding are connected to a control circuit (not shown) via terminal blades 57, which are electrically connected to a cable (not shown). As shown in FIGS. 1–3 and 6, when coil assembly 50 (including bobbin 52, wire 55, and terminal blades 57) is molded into plastic jacket 34, the molding process provides a region 54 of electrically insulating material that becomes disposed around wire 55 and internally of body 42. Insulating region 54 physically separates and electrically insulates wire 55 of coil assembly 50 from body 42. As shown in FIGS. 4 and 5B for example, body 42 defines a cut out 43 disposed near supply end 38 of body 42 to accommodate passage of terminal blades 57 into auxiliary branch 36 of plastic jacket 34 when plastic jacket 34 is molded around coil assembly 50.

In accordance with the present invention, the hydraulic sub-assembly of the electromagnetically actuated disc-type valve includes a core member having an exterior surface that includes a bottom surface. The core member forms the single working pole of a magnetic circuit and provides the internal passage for the fluid passing through the valve. As embodied herein and shown in FIGS. 1, 4 and 5A, a core member 46 is disposed within body 42 and plastic jacket 34. Core member 46 is disposed symmetrically about central longitudinal axis 44.

Core member 46 forms part of the magnetic circuit of the valve and therefore must be composed of magnetic material, desirably stainless steel tubing. An example of a suitable piece of such tubing has an internal diameter of 3.65 mm and an external diameter of 6.0 mm. Thus, as shown in FIGS. 1–5A and 6 for example, core member 46 forms an elongated cylindrical hollow member defining an internally disposed central axial passage 48. As shown in FIGS. 4 and 5A for example, central axial passage 48 extends to a fluid inlet 51, which is connected to a source of fuel under pressure when the valve of the present invention is used as a fuel injector.

As noted above, core member 46 is a component of the valve's hydraulic sub-assembly 131, and plastic jacket 34 is a component of the valve's electrical sub-assembly 132. As shown in FIG. 1, these two sub-assemblies 131, 132 of the valve of the present invention are secured to one another in part (at the supply end of the valve) by top bushing 40, which is fixed by welds 29 to core member 46 and inserted into the supply end of plastic jacket 34. Desirably, these welds 29 are produced by a laser welder such as a neodymium doped Yttrium-Aluminum-Garnet (Nd:YAG) laser.

As shown in FIGS. 1–3 and 6, coiled wire 55 of coil assembly 50 is disposed to surround the delivery end of core member 46. As shown in FIGS. 1, 4 and 5B, a body flange 49 is provided in the form of an annular ring, which is received into jacket 34 and must be formed of magnetic material to complete the magnetic circuit between core member 46 and valve body 42 in plastic jacket 34. Body flange 49 also assists during molding in securing bobbin 52 therein. Body flange 49 is of simple construction that does not require any secondary machining. As shown in FIGS. 2, 3, 6 and 8, a bottom surface 56 of core member 46 desirably is flat. Bottom surface 56 of core member 46 forms one working pole of an electromagnet, which is selectively actuated when the control circuit provides electric power to coil assembly 50 via terminal blades 57.

Figure 6:
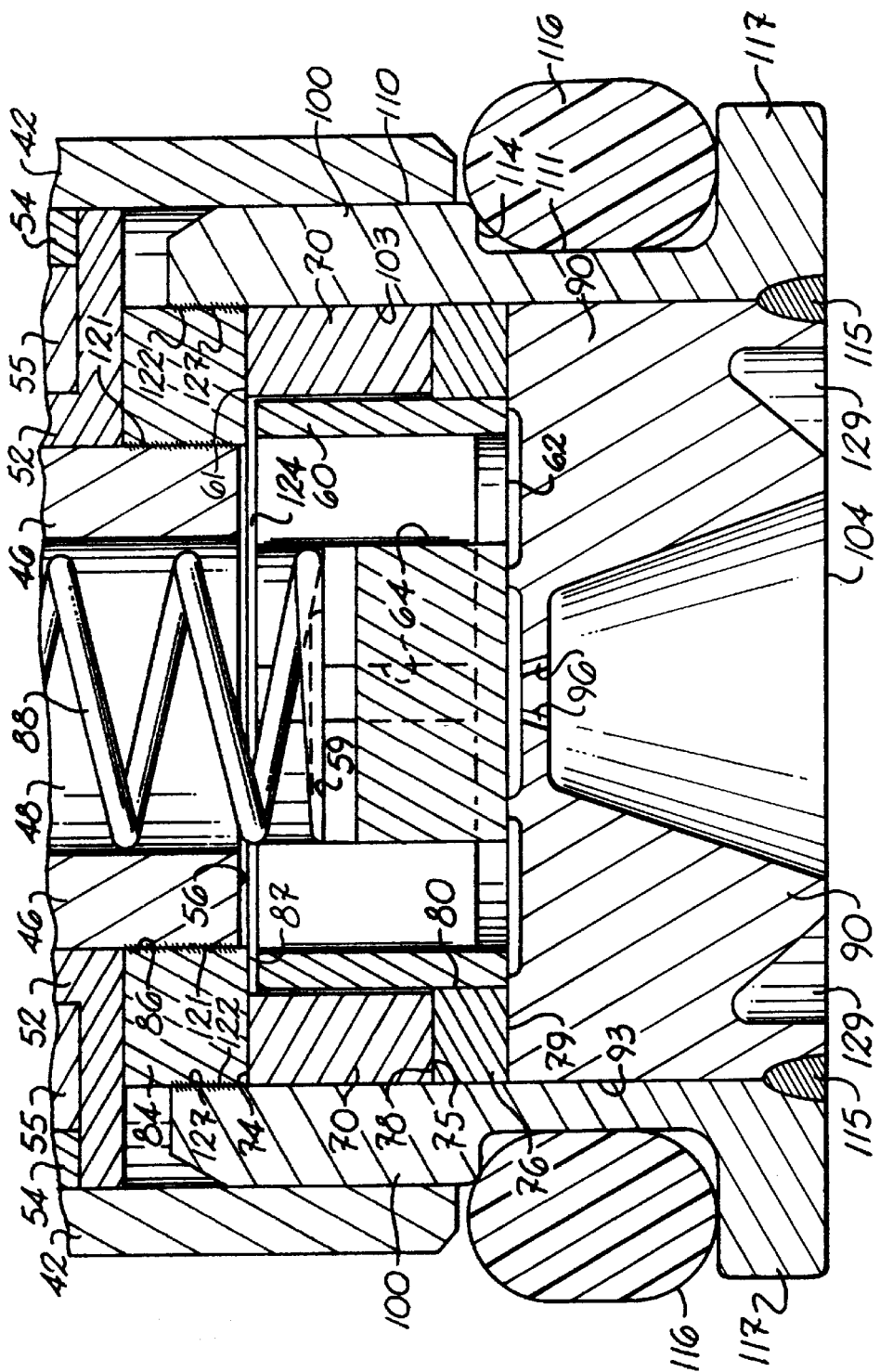
FIG. 6 is a partial cross-sectional view depicting an alternative embodiment from a perspective similar to the view shown in FIG. 2.
Figure 7:
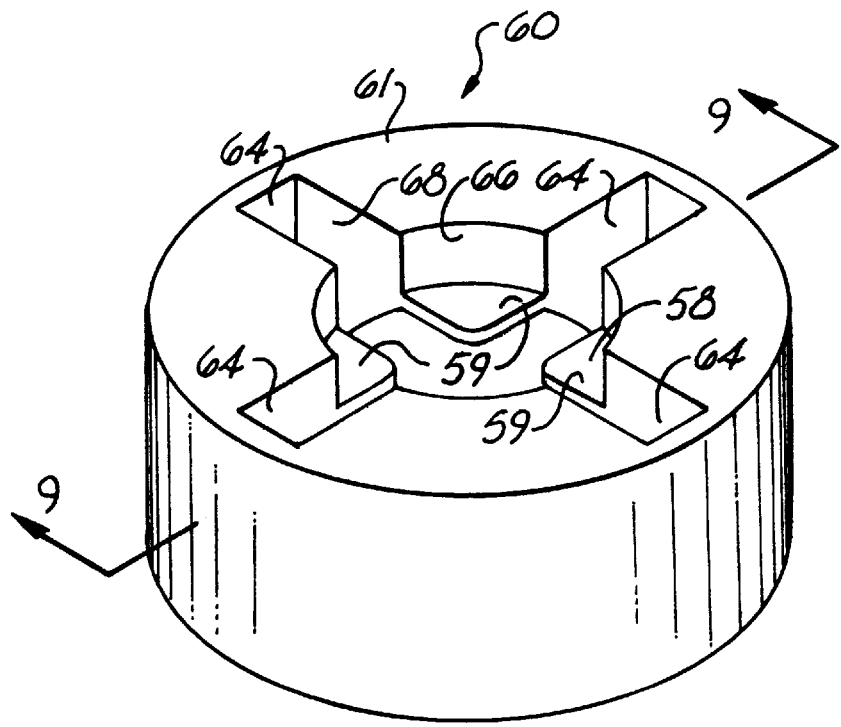
FIG. 7 is an elevated perspective top view of an embodiment of the armature component of the valve shown in FIG. 1.
Figure 8:
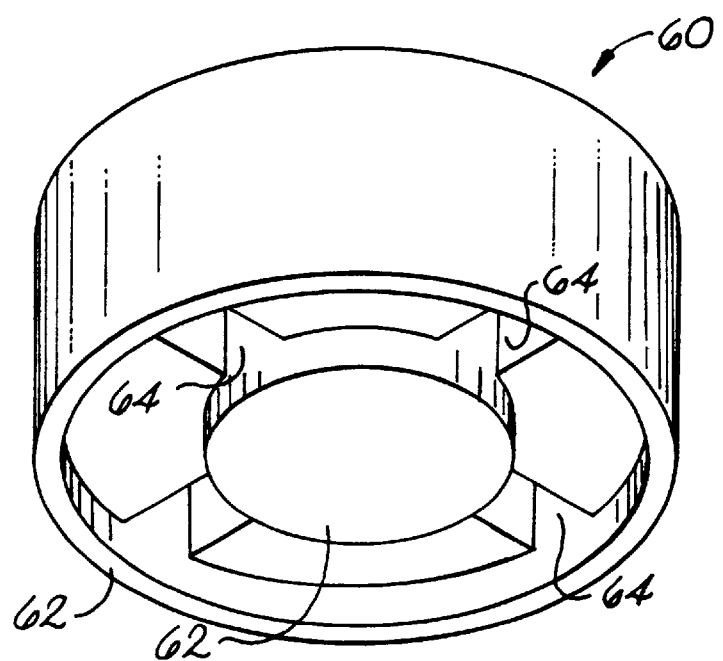
FIG. 8 is an elevated perspective bottom view of the embodiment of the armature component shown in FIG. 7.
Figure 9:
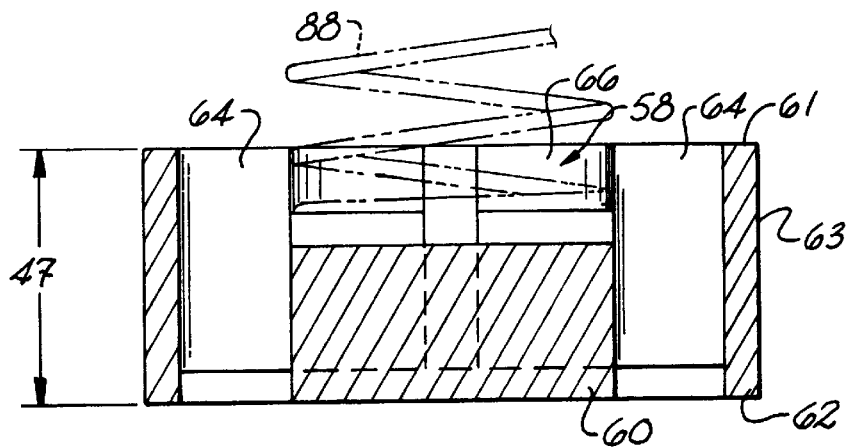
FIG. 9 is a cross-sectional view of the embodiment of the armature component shown in FIGS. 7 and 8 taken in the direction in which arrows 9—9 point in FIG. 7.
Figure 12:
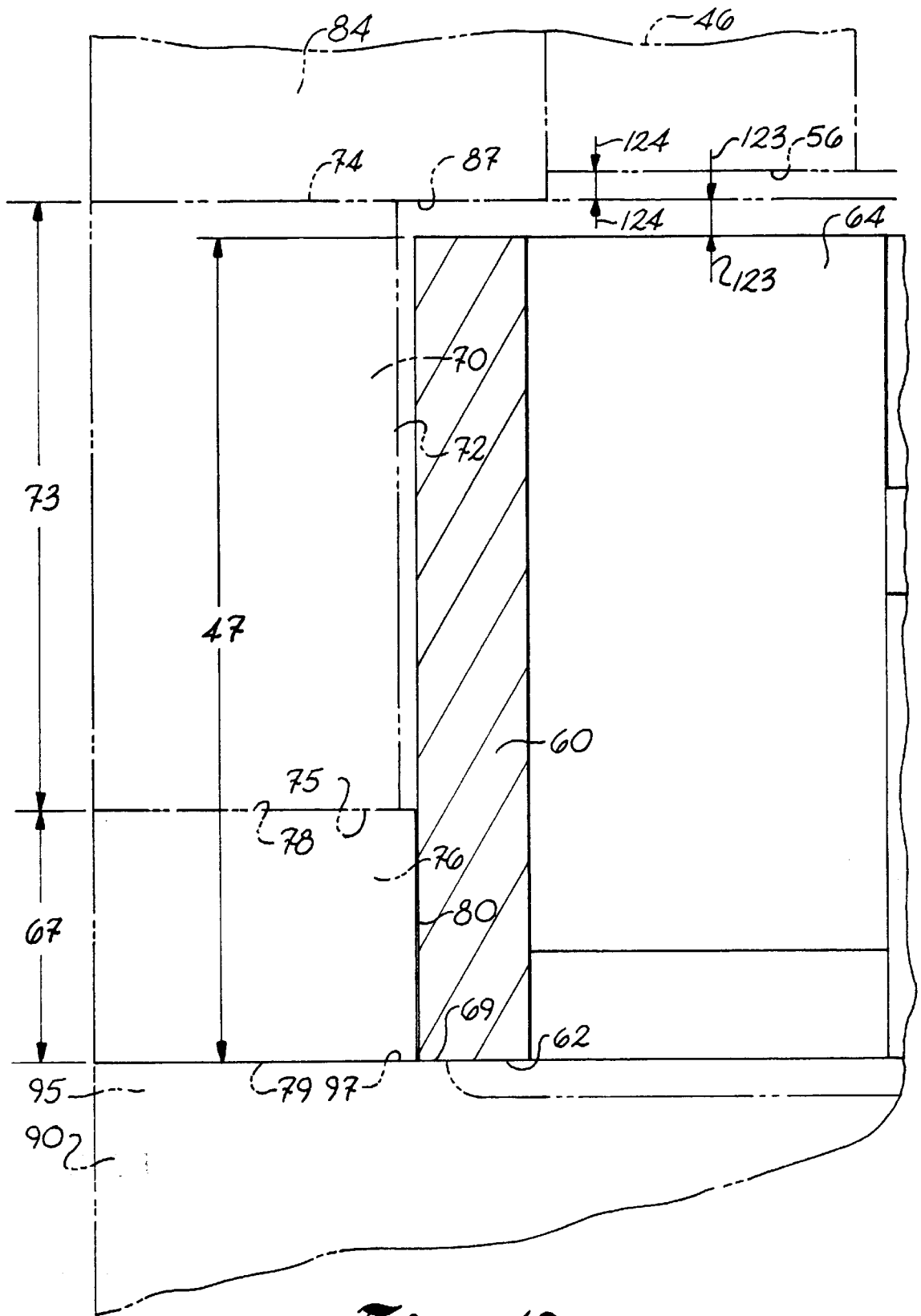
FIG. 12 is an enlarged partial cross-sectional view of the embodiment of the armature component shown in FIGS. 7–9 with surrounding components shown in dashed lines.

In accordance with the present invention, the hydraulic sub-assembly of the valve includes another component, which is an armature having a top surface disposed toward the bottom surface of the core member. Apart from the spring (described below), the armature is the only component that moves during operation of the valve and embodies the moving mass of the valve. As shown in FIGS. 7 and 8, an armature 60 is configured in the form of a disc having a top surface 61 and a bottom surface 62 disposed to face opposite top surface 61. As shown in FIGS. 2–4 and 6, top surface 61 of armature 60 is disposed toward bottom surface 56 of core member 46. As shown in FIG. 4, armature 60 has a centrally disposed axis 44 of rotation. As shown in FIG. 9, armature 60 is configured with a cylindrically-shaped outer side surface 63 that is disposed parallel to the centrally disposed axis 44 (FIG. 4) and that extends axially from top surface 61 to bottom surface 62. As shown in FIGS. 9 and 12, the axial thickness of outer side surface 63 is measured by a straight side depth dimension 47. As shown in FIGS. 7 and 12, armature 60 also has a circumferential dimension which is defined by the diameter of armature 60 and is measured perpendicularly with respect to straight side depth dimension 47. Desirably, armature 60 can be molded from magnetic material such as three percent silicon iron in a manner so that only a small amount of secondary machining is required to finish the exterior surfaces 61, 62, 63 of armature 60. Magnetic stainless steel also could be used to form armature 60. The provision of a straight side surface 63 in armature 60 eliminates the need for machining that might be required to produce a spherical side surface. In a presently preferred embodiment, straight side dimension 47 shown in FIGS. 9 and 12 desirably measures 3.0 mm, and the diameter of armature 60 desirably measures 7.2 mm.

As shown in FIGS. 2–4 and 7–12, armature 60 has at least one fluid passage 64 extending generally axially through armature 60. As shown in FIG. 7, armature 60 is configured with a plenum 66, which is generally disposed centrally of armature 60 and that communicates with at least one fluid passage 64 via at least one conduit 68. Desirably, armature 60 has a plurality of fluid passages 64, four being shown in FIGS. 2, 3, 4, 6, 7 and 8 for example. Each fluid passage 64 is configured and disposed to receive fluid from plenum 66 via a corresponding conduit 68. In a presently preferred fuel injector embodiment, each fluid passage 64 has a cross-sectional area of 0.96 mm$^2$, each conduit 68 has a cross-sectional area of 1.2 mm$^2$, the diameter of plenum 66 is 3.4 mm, and the axial depth of plenum 66 is 1.0 mm.

As shown in FIGS. 7 and 9 for example, the peripheral bottom portion of plenum 66 is defined by a spring pocket 58 which is configured to receive and support the tensioning spring 88 (described below) of the valve. In the embodiment shown in FIGS. 2, 3, 6, 7 and 9, spring pocket 58 includes at least one spring seat 59 against which spring 88 rests. Four spring seats 59 are symmetrically disposed around the inner periphery of plenum 66 shown in FIGS. 7 and 9.

Figure 10:
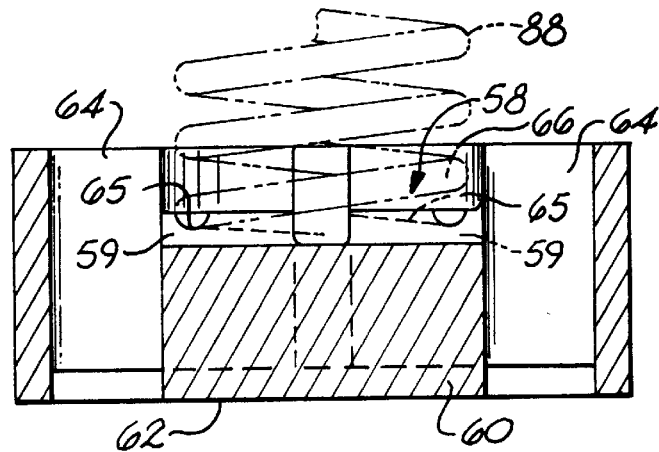
FIG. 10 is a cross-sectional view depicting an alternative embodiment of an armature from a perspective similar to the view shown in FIG. 9.

In an alternative embodiment of armature 60 shown in FIG. 10, spring pocket 58 is defined by a helical groove 65 formed in each of the four spring seats 59. Desirably, each helical groove 65 is configured so that the end of spring 88 need not be ground flat. Thus, the end of spring 88 can have a helical configuration, yet can rest in one of these helical grooves 65 to prevent movement of the unground end of spring 88, which has a pitch of 0.8 mm and an angle of 6 degrees. Thus, this helical grooved pocket embodiment provides a cost saving by eliminating the need to use a spring with ends that are finished, as by having been ground flat.

Figure 11:
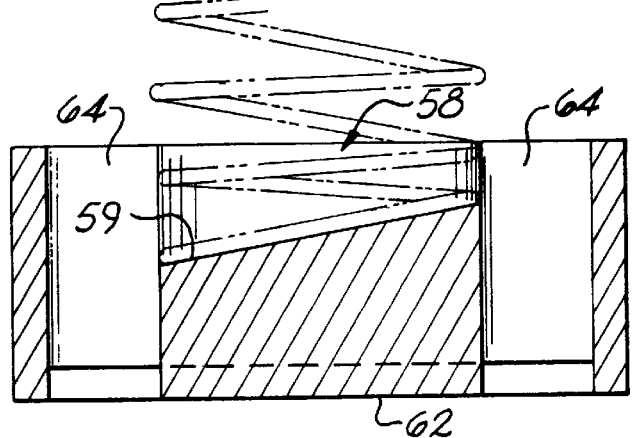
FIG. 11 is a cross-sectional view depicting an alternative embodiment of an armature from a perspective similar to the view shown in FIG. 9.

In another alternative embodiment of armature 60 shown in FIG. 11, spring pocket 58 has a spring seat 59 that is canted at an angle with respect to bottom surface 62 of armature 60. An angle of 14 degrees is believed to be desirable. However, other angles also might be satisfactory depending on the dimensional relationships. This FIG. 11 angle pocket embodiment is configured to encourage armature 60 to move against the tensioning force of spring 88 in a consistent and repeatable manner. Desirably, each of the helical grooved seat embodiment (FIG. 10) of armature 60 and the angle pocket embodiment (FIG. 11) of armature 60 is fabricated using metal injection molding techniques.

Figure 2:
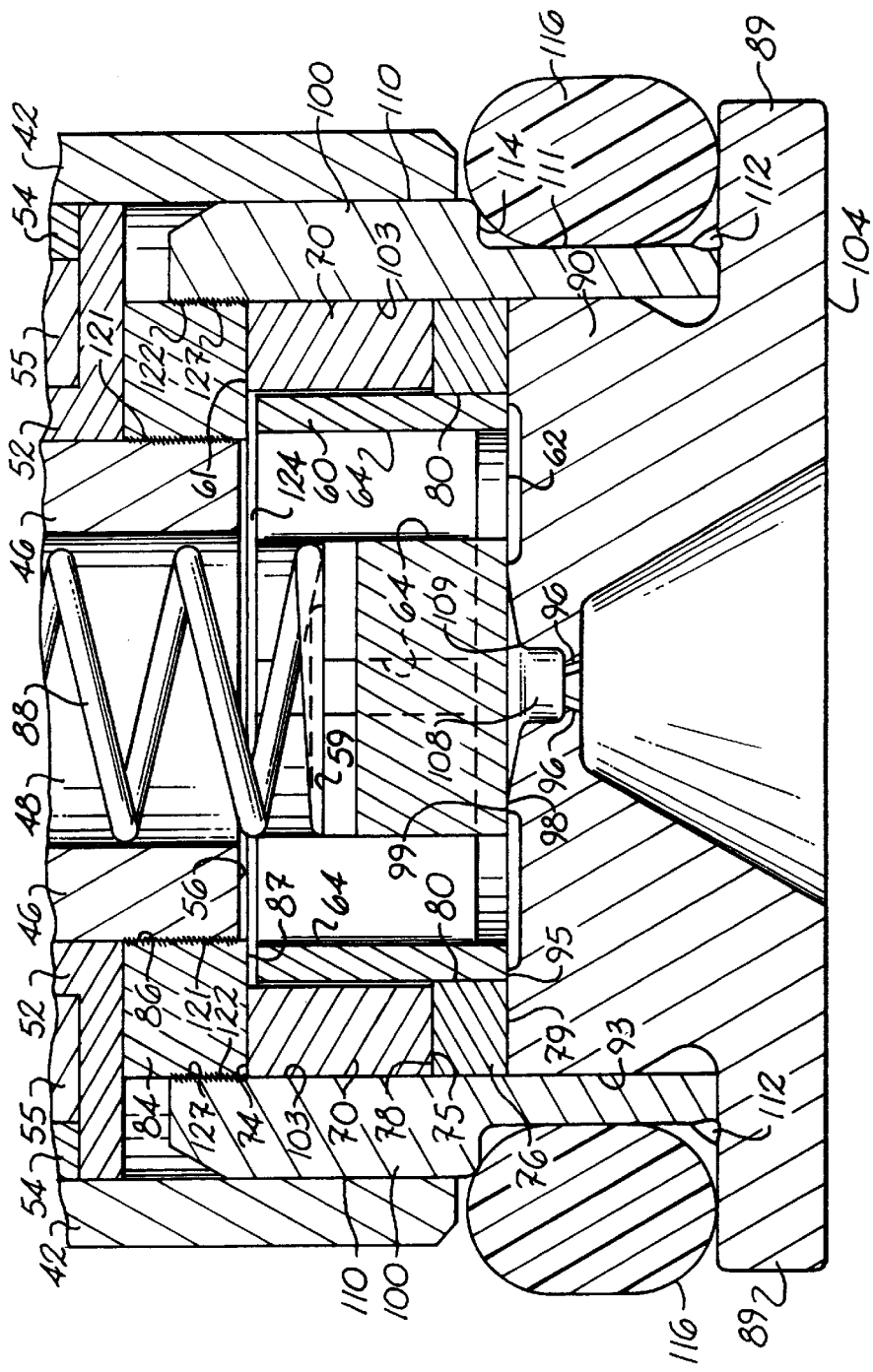
FIG. 2 is a cross-sectional view of the circled portion labeled FIG. 2 in FIG. 1 configured in a position closed to the flow of fluid.
Figure 3:
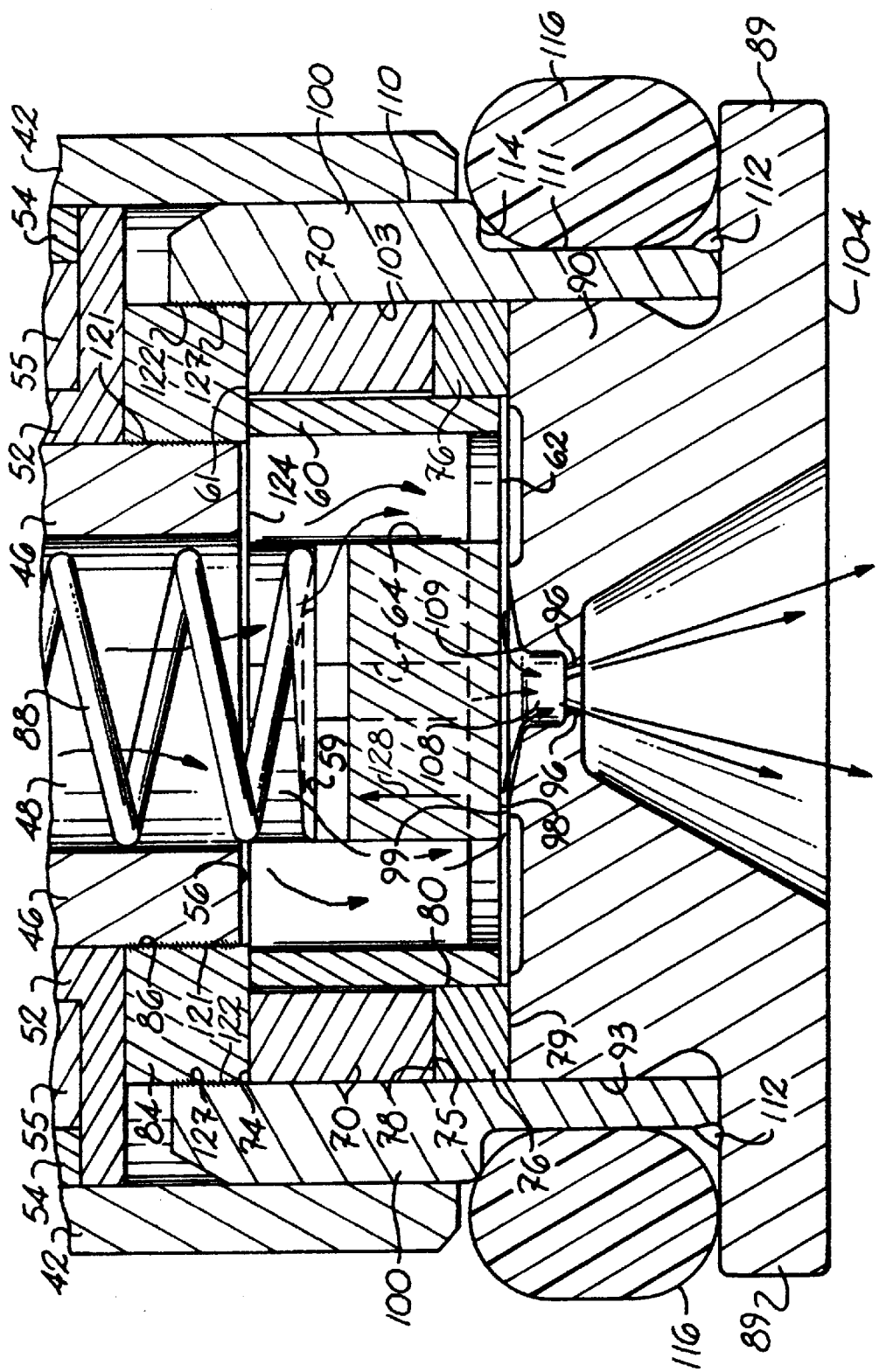
FIG. 3 is a cross-sectional view of the circled portion labeled FIG. 2 in FIG. 1 configured in a position open to the flow of fluid indicated by the curved-stem arrows.

In accordance with the present invention, the hydraulic sub-assembly of the valve includes a yet another component, which is a magnetic pole configured in the form of an annular sleeve and disposed to surround the armature and define another part of the magnetic circuit. The magnetic pole must be formed of a magnetic material, desirably magnetic stainless steel. As embodied herein and shown in FIGS. 1–4 and 6, an annular magnetic pole 70 is disposed within body 42. As shown in FIG. 4, magnetic pole 70 is configured with a centrally disposed opening 71. Armature 60 is disposed within opening 71, which has a circular transverse cross-section defined by an interior diameter. In a presently preferred embodiment shown in FIG. 4, the interior diameter of magnetic pole 70 measures 7.315 mm, and the magnetic pole's exterior diameter measures 9.19 mm. As shown in dashed line in FIG. 12 for example, magnetic pole 70 has a cylindrically-shaped interior side surface 72 defined by a straight side depth dimension 73 and a circumferential dimension disposed perpendicularly with respect to the straight side depth dimension 73, which is measured in an axial direction and is also known as the axial thickness of magnetic pole 70. In a presently preferred embodiment shown in FIG. 12 for example, the straight side depth dimension 73 of magnetic pole 70 measures 2.5 mm. As shown in FIGS. 2–4 and 6 for example, magnetic pole 70 has a top surface 74. As shown in FIGS. 2, 3 and 6 for example, magnetic pole 70 has a bottom surface 75 disposed opposite to top surface 74.

In accordance with the present invention, the hydraulic sub-assembly of the valve includes still another component, which is a guide ring configured in the form of an annular sleeve. The guide ring is formed of non-magnetic material such as non-magnetic stainless steel and is configured and disposed to prevent physical contact between the armature and the magnetic pole. In particular, such physical contact is prevented when the core member is energized so that the armature, the magnetic pole and the core member form part of a magnetic circuit. As embodied herein and shown in FIG. 4, a guide ring 76 is configured in the form of another annular sleeve and has a centrally disposed opening 77 defined by an interior diameter. Guide ring 76 can desirably be formed of a fine blanked component having an internal diameter of 7.215 mm and an external diameter of 9.19 mm. Guide ring 76 has a top surface 78 and a bottom surface 79 opposed to top surface 78. As shown in FIGS. 3, 4 and 6 for example, top surface 78 of guide ring 76 is disposed to contact and rest beneath a bottom surface 75 of magnetic pole 70. Guide ring 76 has a cylindrically-shaped interior side surface 80 extending axially from top surface 78 to bottom surface 79 and defining central opening 77. As shown in dashed line in FIG. 12, an interior straight side depth dimension 67 measures the thickness of guide ring 76 along the axial direction. In the embodiment shown in FIG. 12 for example, interior straight side depth dimension 67 measures 0.55 mm. As shown in FIGS. 3, 4 and 6, the interior straight side depth dimension 67 of guide ring 76 desirably is configured in relation to the exterior diameter of armature 60, the amount of lift permitted the armature 60, and the diametrical clearance between the central opening 77 of guide ring 76 and the armature 60 such that jamming of the armature 60 so as to prevent armature 60 from moving, will be precluded. Interior side surface 80 of guide ring 76 also is defined by a circumferential dimension measured in a perpendicular direction with respect to the axial direction and thus also with respect to the straight side depth dimension 67 of guide ring 76.

While the armature of the valve of the present invention is thicker than the normal thickness of an armature in a conventional electromagnetically actuated disc-type valve, the armature of the present invention is centered by a very thin guide ring. Moreover, the guide ring is positioned to guide the armature by contacting the portion of the armature disposed farthest away from the attractive magnetic pole formed by core member 46 when coil assembly 50 is supplied with electric current. While the armature may tilt as it lifts toward bottom surface 56 of core member 46, the maximum tilt of the armature is determined in part by the armature's external diameter and the maximum lift distance of the armature. In addition, several parameters are chosen so as to constrain the maximum tilt of the armature such that the armature cannot jam when undergoing maximum tilting. These parameters are the axial thickness 67 of the guide ring 76, the diametrical clearance between the interior side surface 80 of guide ring 76 and the outer side surface 63 of armature 60, and the diametrical clearance between the interior side surface 72 of magnetic pole 70 and the outer side surface 63 of armature 60.

As embodied herein and shown in FIGS. 1–3, 6 and 12, guide ring 76 centers armature 60. As shown in FIG. 12 in particular, the interior diameter of guide ring 76 is close to the exterior diameter of armature 60 and smaller than the interior diameter of magnetic pole 70. These clearances help prevent physical contact between armature 60 and magnetic pole 70. Similarly, as shown in FIG. 12, the axial thickness, i.e., straight side depth dimension 67, of guide ring 76 is sized in relation to the straight side depth dimension 73 of magnetic pole 70 and the straight side depth dimension 47 of armature 60 so that when armature 60 is attracted toward bottom surface 56 of core member 46 and butts against a lift stop member 84 (described below), armature 60 cannot tilt sufficiently to contact magnetic pole 70 or to jam and fail to move in response to the application of magnetic force. Thus, each of guide ring 76, magnetic pole 70, and armature 60 is configured and disposed to prevent physical contact between armature 60 and magnetic pole 70 when core member 46, armature 60, and magnetic pole 70 are disposed to form a magnetic circuit with a single working pole as shown in FIG. 3 for example. Similarly, each of guide ring 76, magnetic pole 70 and armature 60 is configured and disposed to prevent armature 60 from jamming even when armature 60 is maximally tilted.

In accordance with the present invention, the hydraulic sub-assembly of the valve includes still another component, which is a lift stop member configured in the form of a yet another annular sleeve. The lift stop member is configured and disposed to form the interface between an electrical sub-assembly of the valve and an hydraulic sub-assembly of the valve. The lift stop member also is configured and disposed to block the armature from making metal-to-metal contact with the magnetic pole formed by the bottom surface of the core member when the coil is electrified. As embodied herein and shown in FIGS. 1–5A and 6, a lift stop member 84 desirably is configured in the form of an annular sleeve. As shown in FIG. 4, lift stop member 84 has a lower surface consisting of a repeated pattern of a high step 83 disposed adjacent a low step 53. In FIG. 4, lift stop member 84 is turned into a view that permits viewing of steps 83, 85. Low steps 53 are provided to reduce the contact that armature 60 makes with lift stop member 84 and to reduce pumping losses as the armature moves in the vicinity of the lift stop member 84.

As shown in FIG. 4, lift stop member 84 has a centrally disposed opening 85 defined by an interior diameter. As shown in FIGS. 2, 3 and 6, the interior diameter of lift stop 84 is slightly larger than the exterior diameter of core member 46. As shown in FIGS. 2–4 and 6, lift stop member 84 has a cylindrically-shaped interior side surface 86 defining central opening 85. Lift stop member 84 is formed of non-magnetic material such as non-magnetic stainless steel. As shown in FIGS. 2, 3 and 6, lift stop member 84 is configured and disposed to prevent physical contact between armature 60 and bottom surface 56 of core member 46. This is especially true when coil assembly 50 is selectively electrically actuated so that core member 46, armature 60, and magnetic pole 70 form part of a magnetic circuit with core member 46 forming a single working pole when coil is electrically actuated. In a presently preferred embodiment, lift stop member 84 has an interior diameter of slightly more than 6.0 mm and an exterior diameter of 9.19 mm.

Figure 13:
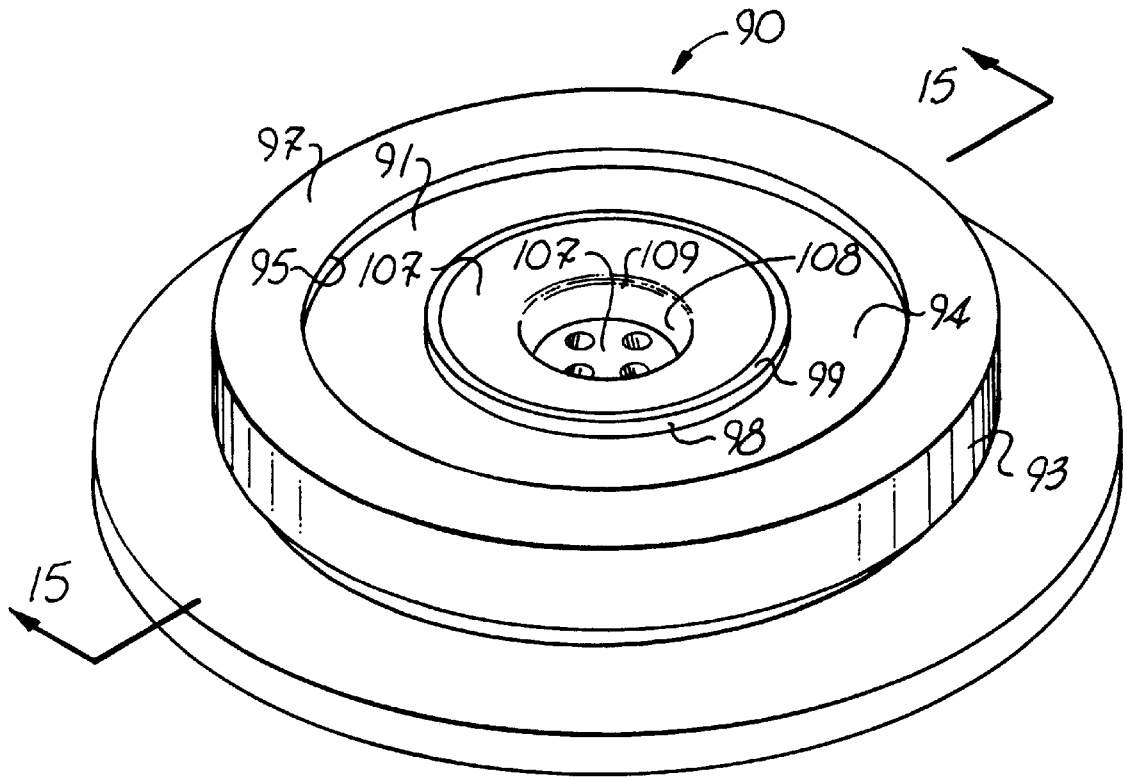
FIG. 13 is an elevated perspective top view of an embodiment of the valve seat component of the valve shown in FIG. 1.
Figure 14:
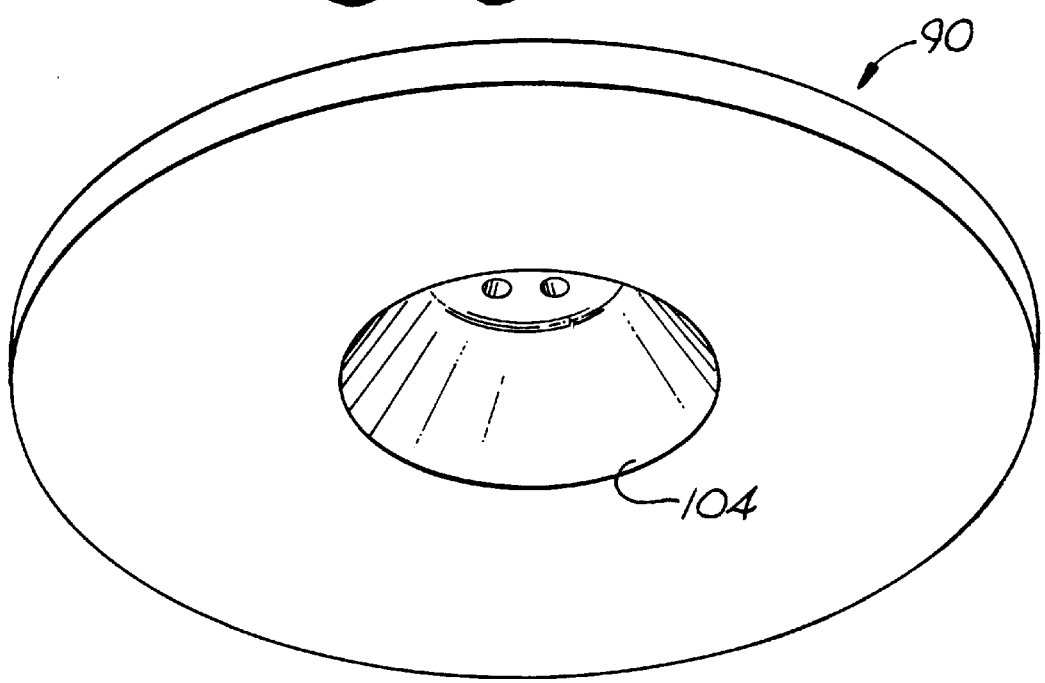
FIG. 14 is an elevated perspective bottom view of the embodiment of the valve seat component shown in FIG. 13.

In accordance with the present invention, the hydraulic sub-assembly of the valve includes yet another component, which is a valve seat. One end of the valve seat is configured with an interior surface forming a receiving chamber disposed to face toward the bottom surface of the armature. The opposite end of the valve seat defines an exit opening that is configured and disposed in communication with the receiving chamber. In some embodiments, this opposite end of the valve seat also can include an external flange disposed about the exit opening. As embodied herein and shown in FIGS. 2–4 and 6, a valve seat 90 is provided in the form of a disc-shaped member that is flanged at one end and disposed at the delivery end 32 (FIG. 1) of the valve. As embodied shown in FIGS. 2–4 and 13–15, valve seat 90 includes an external flange 89 (see FIG. 5A) that is disposed about an exit opening 104. As embodied herein and shown in FIGS. 4, 13, 15 and 16 for example, valve seat 90 has a top face (generally designated by the number 91) that is configured to be disposed toward bottom surface 62 of armature 60 and includes a top surface 94. As shown in FIGS. 13 and 16 for example, top surface 94 of valve seat 90 defines an interior surface 107 forming a receiving chamber 108, which has a radiused entrance 109 that is configured to receive fluid flowing through fluid passages 64 of armature 60 and direct this fluid into chamber 108. In a presently preferred embodiment with the dimensions disclosed herein, the radius of curvature of radiused entrance 109 is 0.250 mm.

As shown in FIGS. 13 and 16 for example, a so-called sealing land 98 is provided on the valve seat's top face 91 and has an upper surface 99 raised above top surface 94 of valve seat 90. As shown in FIGS. 2–4 and 6 for example, sealing land 98 is disposed toward bottom surface 62 of armature 60. At least one so-called sealing land 98 desirably is provided to surround the entrances to all of the paths that would permit fluid to flow through valve seat 90. As shown in FIG. 16 for example, the paths that would permit fluid to flow through valve seat 90 would include radiused entrance 109, receiving chamber 108, outlet conduits 96, and exit opening 104. As shown in FIG. 2, sealing land 98 is disposed to surround the radiused entrance 109 of chamber 108 and block access to chamber 108 from fluid passages 64 of armature 60 when bottom surface 62 of armature 60 is resting atop upper surface 99 of sealing land 98.

Figure 15:
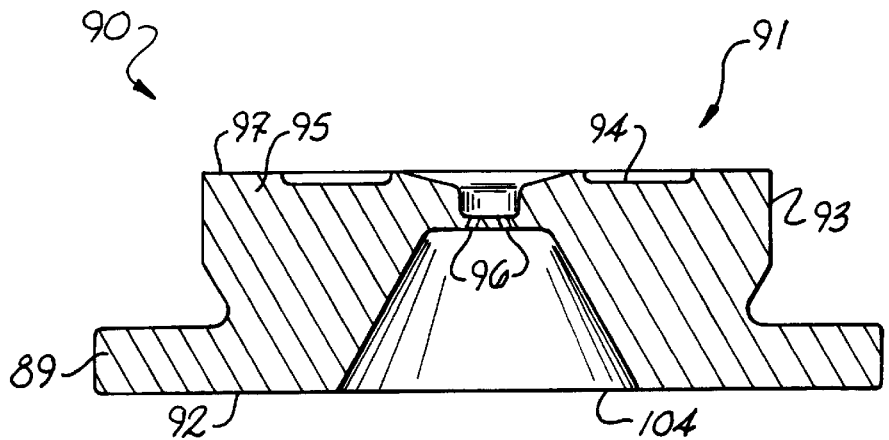
FIG. 15 is a cross-sectional view of the embodiment of the valve seat component shown in FIGS. 13 and 14 taken in the direction in which arrows 15—15 point in FIG. 13.
Figure 16:
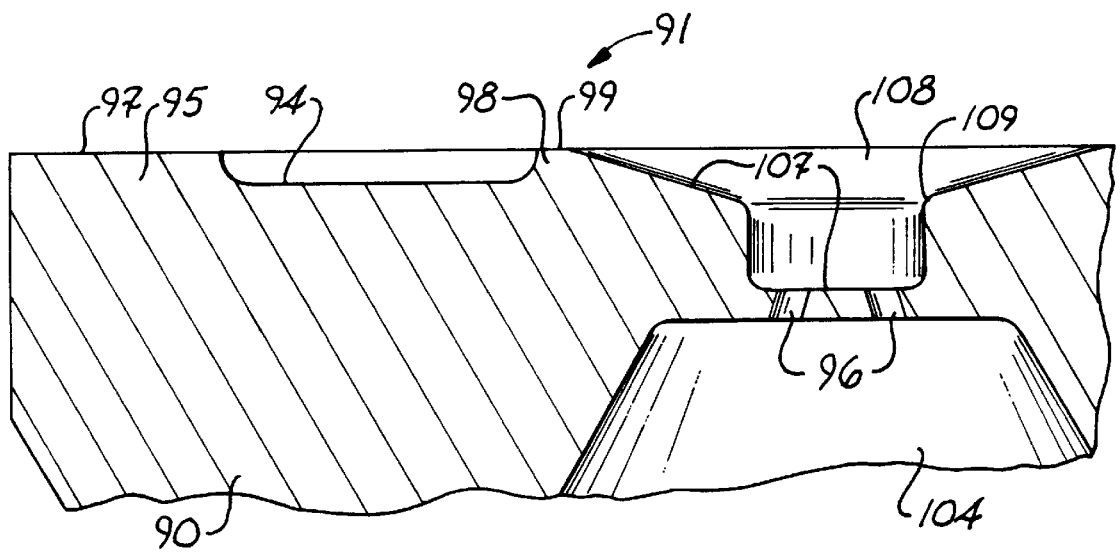
FIG. 16 is an enlarged partial cross-sectional view of the embodiment of the valve seat component shown in FIG. 15.

As shown in FIGS. 13, 15 and 16 for example, top face 91 of valve seat 90 also includes a so-called support land 95 having a support surface 97 raised above top surface 94. As shown in FIG. 12 for example, support surface 97 of support land 95 of valve seat 90 is configured to support and receive the peripheral portion 69 of bottom surface 62 of armature 60. As shown in FIG. 2, armature 60 is biased into contact with support land 95 and sealing land 98 of valve seat 90 by means of a coiled compression spring 88. Thus, spring 88 provides a means of resiliently biasing bottom surface 62 of armature 60 against sealing land 98 and support land 95 of valve seat 90. As shown in FIGS. 2–5A, 6 and 9–11, each end of spring 88 is closed on itself and machined in a flat plane.

Accordingly, it is important that support surface 97 of support land 95 of valve seat 90 is configured to support and receive the peripheral portion 69 of bottom surface 62 of armature 60. Otherwise, the repeated downward movements of armature 60 would be stopped solely by contact with upper surface 99 of sealing land 98 and result in excessive wear of sealing land 98 and consequently poor sealing performance of the valve. The support surface 97 of support land 95 and the upper surface 99 of sealing land 98 of top face 91 of valve seat 90 permit the top face 91 of valve seat 90 to cooperate with bottom surface 62 of armature 60 to seal off the flow of fluid through the valve of the present invention. As shown in FIG. 16 for example, sealing land 98 and support land 95 desirably form a unitary structure with valve seat 90.

Valve seat 90 defines a centrally disposed longitudinal axis 44 and has a cylindrically-shaped outer side surface 93 defined by a straight side depth dimension measured in a direction parallel to the central axis 44. As shown in FIG. 15 for example, valve seat 90 has a bottom surface 92 disposed to face opposite top surface 94, and exit opening 104 is configured in a bell-shape and disposed to expand through bottom surface 92 in the fuel injector embodiment shown. However, other configurations for the exit opening 104 of valve seat 90 can be used as known in the art. Moreover, as shown in FIGS. 2, 3 and 16 for example, exit opening 104 is disposed in communication with conduits 96 and receiving chamber 108. Together, exit opening 104, conduits 96 and receiving chamber 108 provide valve seat 90 with at least one hole extending completely through valve seat 90 generally in the direction of axis 44. As known in the art, the transverse cross-sectional shape of this hole can be other than circular. In the injector embodiment of FIG. 3, the solid and dashed curved arrows schematically indicate the flow of liquid fuel through armature 60 and valve seat 90.

In accordance with the present invention, the hydraulic sub-assembly of the valve includes still another component, which is a nozzle forming part of a housing within which the armature moves. The nozzle of the armature housing is configured and disposed to define the sides of an internal compartment that houses the magnetic pole and the guide ring between the lift stop member and the valve seat. The nozzle's end that engages the valve seat is the delivery end, and the opposite end of the nozzle is the supply end. The interior surface of the supply end of the nozzle is configured and disposed to be welded to the exterior surface of the lift stop member. The free edge of the delivery end of the nozzle is configured and disposed to be welded to the external flange of the valve seat.

As embodied herein and shown in FIGS. 1–5A and 6, a nozzle 100 desirably is configured in the form of an annular sleeve. As shown in FIG. 4, nozzle 100 has a centrally disposed internal opening 101 defined by an interior diameter and forming a receiving compartment 102. As shown in FIGS. 2, 3 and 6, the interior diameter of nozzle 100 is slightly larger than the exterior diameters of magnetic pole member 70 and guide ring 76. As shown in FIGS. 2–4 and 6, nozzle 100 has a cylindrically-shaped interior side surface 103 defining opening 101. Nozzle 100 is formed of magnetic material, desirably stainless steel. When nozzle 100 is configured and disposed as shown in FIGS. 2, 3 and 6, receiving compartment 102, which is shown in FIG. 4 for example, houses magnetic pole 70 and guide ring 76 between lift stop member 84 and valve seat 90. Receiving compartment 102 also houses armature 60 internally of magnetic pole 70 and guide ring 76. In a presently preferred embodiment, nozzle 100 has an interior diameter of slightly more than 9.2 mm.

In the embodiment shown in FIGS. 1–3, the delivery end of nozzle 100 is welded to the external flange 89 of valve seat 90. Desirably, the welds 112 are provided by a laser welder such as a neodymium-doped yttrium-aluminum-garnet (Nd:YAG) laser. This welding location on external flange 89 of valve seat 90 is sufficiently shielded from support land 95 and sealing land 98 of valve seat 90 so as to avoid adverse effects to sealing land 98 (such as caused by excessive upward bowing of top face 91 of valve seat 90, distortion of top face 91, and all downward bowing of top face 91) of the welding's heat stress that otherwise might cause leakage. Upward bowing of sealing land 98 should be held between one and four microns for optimum sealing between sealing land 98 of valve seat 90 and bottom surface 62 of armature 60. By distortion is meant that sealing land 98 would be so contorted that no planar line of contact would exist with bottom surface 62 of armature 60. In an alternative embodiment including nozzle 100 and valve seat 90 configured as shown in FIG. 6 for example, valve seat 90 is provided with such shielding by a circumferential notch 129 near exit opening 104 and side surface 93 of valve seat 90. As shown in FIG. 6, welds 115 (desirably laser welds such as Nd:YAG welds) are used to attach valve seat 90 to the delivery end of nozzle 100 in the vicinity of notch 129 of valve seat 90 and external flange 117 of nozzle 100. As shown in FIG. 6, notch 129 of valve seat 90 sufficiently shields this welding location from support land 95 and sealing land 98 of valve seat 90 so as to avoid adverse effects (described above) of the heat stress attributable to the welding process that otherwise might cause leakage. Thus, the hydraulic sub-assembly of the valve of the present invention is hermetically sealed by the use of welds 112 (or 115), 121, 122. In accordance with the present invention, there is no need for any internally disposed O-ring for the purpose of hydraulically sealing the valve against leakage.

As shown in FIGS. 2 and 3 for example, the exterior circumferential surface of nozzle 100 is stepped toward the delivery end of nozzle 100 so that the exterior diameter of this stepped region of the delivery end of nozzle 100 is smaller than the exterior diameter of the exterior circumferential surface 110 of the supply end of nozzle 100. As shown in FIGS. 2 and 3, an external O-ring 116 can be received around this reduced diameter region 111 of nozzle 100. O-ring 116 is retained on one end by external flange 89 of valve seat 90. On the other end, O-ring 116 is retained in part by the shoulder 114 formed by the transition from the relatively smaller diameter region of the external surface of the delivery end of nozzle 100 to the relatively larger diameter region of the external surface of the supply end of nozzle 100. In the fuel injector embodiment, an elastomeric seal such as O-ring 116 is used to seal injector 30 in a port of the air inlet of an engine.

In accordance with the present invention, the hydraulic sub-assembly of the valve includes a calibration slide and a filter. The calibration slide provides a means for setting the biasing means such as the spring to apply a desired biasing force to bias the bottom surface of the armature against the sealing land and the support land of the valve seat. Thus, the calibration slide is configured and disposed for setting the force applied by the compression spring to the armature to a magnitude that is selected in the course of a flow test. The filter provides a means for filtering fluid passing through the central passage of the core member. In accordance with the present invention, the filter is configured and disposed so that it is already assembled into the valve before the calibration slide is set and by the time the valve is flow tested during setting of the calibration slide to fix the tension applied by the spring to the armature.

A means desirably is provided for filtering the fluid that passes through the valve. As embodied herein and shown in FIGS. 1, 4 and 5A, the filtering means includes an elongated filter 120 is configured to fit within central passage 48 of core member 46. Rather than being positioned near the supply end 31 of the valve as in conventional fuel injectors, filtering means of the present invention is desirably disposed in central passage 48 of core member 46 closer to the delivery end 32 than to the supply end 31. Moreover, filter 120 is disposed below the calibration slide 125 (described below) in the sense that filter 120 is disposed closer to supply end 32 than calibration slide 125. Thus, during assembly of hydraulic sub-assembly 131, filter 120 is already in place within central passage 48 when calibration slide 125 is inserted to set the tension on spring 88. As shown in FIGS. 4 and 5 for example, filter 120 is carried by an elongated holder 118 having a canted compartment 119 for holding filter 120 at an angle with respect to the central longitudinal axis 44. Holder 118 also provides a centrally disposed opening (not visible in the views shown in the Figs.) through its longitudinal axis and carries filter 120 so as to ensure that fluid must pass through filter 120 before exiting the holder's conventional opening. As shown in FIG. 1 for example, one end of holder 118 is configured with a sufficient radius and gauge to butt against one end of compression spring 88. The opposite end of filter holder 118 is configured to butt against one end of a calibration slide 125.

In an alternative embodiment (not shown), the relative positions of filter 120 and spring 88 could be reversed so that filter holder 118 butts against armature 60. However, in the preferred embodiment illustrated in FIGS. 1–5A, 6 and 9–11, the moving mass is minimized by being restricted to armature 60 and spring 88.

As known in the art, a calibration slide is disposed in the core passage to provide a backstop for the spring, which applies the axial force that biases the armature against the valve seat. In this way, the calibration slide provides a means for setting the biasing means, such as the spring, to apply a desired biasing force so as to bias the bottom surface of the armature against the sealing land of the valve seat. Axial movement of the position of the calibration slide within the central passage of the core member adjusts the magnitude of the force applied by the spring to the armature. While a conventional calibration slide will suffice, as shown in FIGS. 1, 4 and 5A, a calibration slide 125 is desirably formed from an elongated roll of spring steel.

Desirably, each end of calibration slide 125 is shaped identically with a region of reduced diameter so that it can be inserted into passage 48 of core member 46 without digging up shavings from the walls of central passage 48. Otherwise, such metal shavings might clog the fluid flow passages of the valve. Moreover, because filter 120 is already in place within passage 48 when calibration slide 125 is inserted, any such metal shavings caused by the insertion of the calibration slide would be caught by filter 120 rather than result in either clogging or fouling either flow passages 64 of armature 60 or conduits 96 of valve seat 90.

Moreover, each end of calibration slide 125 is configured so that it can be fitted to a tool (not shown) that is used to insert calibration slide 125 internally of passage 48 of core member 46 to permit adjustment of the force applied to armature 60 by the compression spring 88 mounted to the end of filter holder 118. As shown in FIGS. 1, 4 and 5A, calibration slide 125 has a slot 126 running the full length thereof so that the calibration slide can be compressed along the length of this slot 126 to facilitate insertion of calibration slide 125 down into passage 48.

When the valve is flow tested during setting of the calibration slide to fix the tension applied by the spring to the armature, the presence of filter 120 during such flow testing yields a more accurate flow test than if such testing were done without the filter present and the filter later being installed into the valve.

In accordance with the present invention, the full extent of permissible movement of the armature between its resting position when disposed against the valve seat and its actuated position when disposed against the bottom surface of the lift stop member is known as the lift of the armature and is determined by the combined heights of the guide ring and the magnetic pole. In the embodiment shown in FIGS. 2, 3, 6 and 12, a bottom surface 87 of lift stop member 84 is disposed against top surface 74 of magnetic pole 70. Bottom surface 75 of magnetic pole 70 is disposed to contact and rest upon a top surface 78 of guide ring 76. A bottom surface 79 of guide ring 76 is disposed to contact and rest upon support surface 97 of valve seat 90. As shown in FIG. 12 for example, the third straight side depth dimension 47 of armature 60 is about 50 microns less than the sum of the fourth straight side depth dimension 73 of magnetic pole 70 and the fifth straight side depth dimension 67 of guide ring 76. Accordingly, the lift of the armature is about 50 microns and is schematically indicated in FIG. 12 by the straight line disposed between the opposed arrows and labeled 123.

In further accordance with the present invention, the assembly of the valve has been greatly simplified. The desired air gap is the distance between the bottom surface of the core member and the top surface of the armature when the top surface of the armature rests against the bottom surface of the lift stop member. During assembly of the hydraulic sub-assembly of the valve of the present invention, the desired air gap is set when a portion of the exterior surface of the core member is welded to the interior surface of the lift stop member. As shown in FIGS. 2, 3 and 6 for example, at least a first continuous weld (indicated by the row of slash lines labeled 121) is disposed to fix a portion of interior side surface 86 of lift stop member 84 to a portion of the exterior surface of core member 46. Desirably, the welding is performed with a laser welder such as a Nd:YAG welder. Then Nd:YAG welds 112 are used to attach valve seat 90 to the delivery end of nozzle 100 and thereby hermetically seal nozzle 100 to valve seat 90 and form the bottom portion of the receiving compartment 102 that houses armature 60. As shown in FIGS. 2 and 3 for example, welds 112 (desirably laser welds such as Nd:YAG welds) are used to attach valve seat 90 at external flange 89 of valve seat 90 to the free edge of the delivery end of nozzle 100. Alternatively, as shown in FIG. 6 for example, welds 115 (desirably laser welds such as Nd:YAG welds) are used to attach valve seat 90 to the delivery end of nozzle 100 in the vicinity of external flange 89 of valve seat 100. Then, in each embodiment, whether FIGS. 2 and 3 or FIG. 6, guide ring 76, magnetic pole 70, and armature 60 are assembled in the armature housing formed within receiving compartment 102 of nozzle 100. Finally, a portion of the exterior surface of lift stop member 84 is welded (desirably laser welded using a Nd:YAG welder) to a portion of the interior surface 127 of the supply end of nozzle 100. As shown in FIGS. 2, 3 and 6 for example, at least a second continuous weld (indicated by the row of slash lines labeled 122) (also desirably laser welds such as Nd:YAG welds) is disposed to fix lift stop member 84 to interior surface 127 of nozzle 100.

Desirably, as shown in FIGS. 2, 3 and 6, the valve of the present invention includes a first plurality of welds 121 disposed to fix lift stop member 84 to the exterior surface of core member 46, a second plurality of welds 122 disposed to fix lift stop member 84 to interior surface 127 of nozzle 100, and the welds 121, 122 are configured and disposed to hermetically seal the valve and prevent leakage of the fluid during operation of the valve. The use of the welder to weld lift stop member 84 to the exterior surface of core member 46 permits direct setting of the air gap 124 (schematically indicated in FIG. 12 by the straight line disposed between the opposed arrows and labeled 124) defined between top surface 61 of armature 60 and bottom surface 56 of core member 46 when upper surface of armature 60 is positioned against bottom surface 87 of lift stop member 84. As known in the art, the size of this air gap 124 needs to be precisely controlled, regardless of the magnitude of the gap required by the particular valve application. In a presently preferred fuel injector embodiment, this air gap 124 is 20 microns plus or minus 6 microns. Furthermore, these welds 121, 122 are disposed in a manner whereby lift stop member 84 prevents physical contact between armature 60 and bottom surface 56 of core member 46 when core member 46, armature 60, and magnetic pole 70 are selectively actuated to form a magnetic circuit as shown in FIG. 3.

When the welding is completed, core member 46 becomes hermetically sealed to lift stop member 84, lift stop member 84 becomes hermetically sealed to nozzle 100, and nozzle 100 becomes hermetically sealed to valve seat 90. Thus, as shown in FIG. 5A, a first hydraulic sub-assembly 131 includes the armature 60, the core member 46, the lift stop member 84, the guide ring 76, the magnetic pole 70, the valve seat 90, and the nozzle 100, all assembled together and hermetically sealed to one another as explained above. This hydraulic sub-assembly 131 shown in FIG. 5A can be assembled as a separate unit from electrical sub-assembly 132.

As shown in FIG. 5B, electrical sub-assembly 132 includes valve body 42, body flange 49, coil assembly 50 (bobbin 52, wire 55, and terminal blades 57), and plastic jacket 34 covering valve body 42. Electrical sub-assembly 132 is completed when plastic jacket 34 is molded around coil assembly 50, body flange 49, and body 42. Because hydraulic sub-assembly 131 can be assembled separately from electrical sub-assembly 132, the hydraulic sub-assembly 131 is not subjected to the heat stresses and pressure stresses that occur when plastic jacket 34 is molded around supply end 38 of the valve's body 42. Moreover, the separately sealed hydraulic sub-assembly 131 can be independently checked for leakage, static flow rate, and armature lift before being combined with the electrical sub-assembly 132.

As shown in FIG. 1, when hydraulic sub-assembly 131 is inserted into main branch 35 of plastic jacket 34, top bushing 40 is then inserted into receiving end 31 of main branch 35 of plastic jacket 34 and welded to core member 46 at the location generally designated 29 to secure hydraulic sub-assembly 131 to electrical sub-assembly 132. However, before top bushing 40 is welded to core member 46, it becomes possible to orient one or more distinguishing features of hydraulic sub-assembly 131 relative to one or more distinguishing features of electrical sub-assembly 132. For example, it becomes possible to orient the auxiliary branch 36, which contains terminal blades 57, relative to the spray pattern resulting from discharge of fluid from outlet conduits 96 in valve seat 90. When the desired orientation of the desired features has been set, then top bushing 40 is welded into place to fix these relative orientations of the valve's components.

The manufacture of a presently preferred embodiment of the valve of the present invention can be accomplished with very few machining operations. This is possible because core member 46, magnetic pole 70, and body 42 can be cut from a piece of tubing. Moreover, both lift stop member 84 and guide ring 76 can be formed of a fine blanked component. Furthermore, armature 60 can be molded. A small amount of secondary machining is required to finish outer surfaces 61, 62 and 63 of armature 60. Body flange 49 can be formed of a fine blanked component or a powdered metal component.

In the closed position of the valve shown in FIG. 2, bottom surface 62 of armature 60 rests against upper surface 99 of sealing land 98 and support surface 97 of support land 95. In the open position of the valve shown in FIG. 3, when electric current is supplied to coil 50, core member 46 becomes an electromagnet and forms the single working pole of a magnetic circuit in which bottom surface 56 of core member 46 assumes opposite magnetic polarity to top surface 61 of armature 60. The magnetic flux travels through core member 46, armature 60, and magnetic pole 70. As schematically indicated in FIG. 3 by the solid straight arrow 128, armature 60 will be lifted from support land 95 and sealing land 98 and armature 60 will move vertically toward the same direction as arrow 128 points, until top surface 61 of armature 60 rests against bottom surface 87 of lift stop member 84 to form air gap 124 therebetween. With the armature magnetically held in this position, the central fluid passage 48 of core member 46 communicates with plenum 66 and passages 64 of armature 60, so that when the armature is lifted from the lands 95, 98, fluid can flow down the central passage 48 of core member 46, into the plenum 66 of the armature 60 and through the passages 64 of the armature and to receiving chamber 108 and outlet conduits 96 of the valve seat 90. In the injector embodiment, the fuel issuing from the conduits 96 is atomized and flows through the valve seat 90 into an air inlet duct of the associated engine.

In the embodiments shown in FIGS. 1–6, the components are configured with cylindrical symmetry having a circular transverse cross-section. However, cylindrical symmetry having a square or triangular or other polygonal transverse cross-section also could be employed. Moreover, the exterior and/or interior surfaces of these components can be provided with different transverse cross-sectional shapes along one or more portions of their lengths. Similarly, the shapes of the various openings and pathways through which fluid passes through the valve can be provided with different transverse cross-sectional shapes along one or more portions of their lengths, and thus need not be circular.

What is claimed is:

1. A method of assembling an electromagnetically actuatable disc-type valve for metering the supply of fluid, the valve having an armature and a fluid filter, the method comprising the steps of:

inserting the fluid filter into a core passage of the valve;

inserting a setting device into the core passage of the valve after said step of inserting the fluid filter and thereafter setting the biasing tension on the armature with the setting device;

said step of inserting the fluid filter comprising disposing said filter within the core passage so as to be in position within the core passage relative to the setting device to intercept any debris caused by said steps of inserting the setting device and setting the biasing tension on the armature; and thereafter flow checking the valve.

2. A method as in claim 1, wherein the valve includes a calibration slide and a spring, the method further comprising the steps of:

inserting the spring into the valve before inserting the fluid filter into the valve; and inserting the calibration slide into the valve after inserting the fluid filter into the valve.

3. A method of assembling an electromagnetically actuatable disc-type valve for metering the supply of fluid, the valve having a body, a plastic jacket, electrical components, and a self-contained hydraulic sub-assembly including a lift stop member, a core member with an exterior surface, a nozzle with an interior surface, a valve seat, and an armature, the method comprising the steps of:

assembling the self-contained hydraulic sub-assembly separate from the electrical components of the valve;

providing a plastic jacket about at least a portion of the body of the valve and the electrical components of the valve prior to the assembly of the hydraulic sub-assembly within the plastic jacket and the valve body;

static flow testing the hydraulic sub-assembly prior to the assembly of the hydraulic sub-assembly within the plastic jacket and the valve body and thereafter connecting the hydraulic sub-assembly with the body of the valve and the electrical components, including inserting the hydraulic sub-assembly into the plastic jacket and the valve body.

4. A method as in claim 3, wherein before the hydraulic sub-assembly is secured internally of the body and the plastic jacket of the valve, the method includes the step of testing the armature lift of the valve.

5. A method as in claim 3, wherein before the hydraulic sub-assembly is secured internally of the body and the plastic jacket of the valve, the method includes the step of testing the hydraulic sub-assembly for leakage.

6. A method as in claim 3, wherein said step of assembling the self-contained hydraulic sub-assembly separate from the electrical components of the valve includes the steps of:

welding the valve's lift stop member to the exterior surface of the valve's core member so as to set the valve's air gap at a predetermined magnitude and hermetically seal said lift stop member to said core member.

7. A method as in claim 5, wherein said step of assembling the self-contained hydraulic sub-assembly separate from the electrical components of the valve further includes the steps of:

welding the lift stop member to a portion of the nozzle to hermetically seal said nozzle to said lift stop member; and welding the nozzle to the valve seat to hermetically seal the nozzle to the valve seat.

8. A method of assembling an electromagnetically actuatable disc-type valve for metering the supply of fluid, the valve having an electrical sub-assembly including a plastic jacket and at least one distinguishing feature, the valve having an hydraulic sub-assembly including a supply end and a delivery end disposed opposite to the supply end, the hydraulic sub-assembly also including a core member with an exterior surface at the supply end, the hydraulic sub-assembly further including at least one distinguishing feature on the delivery end, the at least one distinguishing features aligning the hydraulic sub-assembly and the electrical sub-assembly relative to each other, the method comprising the steps of:

assembling each of the hydraulic sub-assembly and electrical sub-assembly separate from each other;

providing the plastic jacket only as a component of the electrical sub-assembly prior to assembling the hydraulic sub-assembly and electrical sub-assembly;

inserting the hydraulic sub-assembly through the plastic jacket and into the electrical sub-assembly so that each of the supply end and delivery end of the hydraulic sub-assembly protrudes past the electrical sub-assembly;

disposing a top bushing between the hydraulic sub-assembly at the supply end of the hydraulic sub-assembly and an upper end of the plastic jacket;

thereafter orienting the at least one distinguishing feature of the hydraulic sub-assembly with respect to the at least one distinguishing feature of the electrical sub-assembly; and thereafter welding the top bushing to the hydraulic sub-assembly so as to hold the hydraulic sub-assembly relative to the electrical sub-assembly.

9. A method as in claim 8, wherein the exterior surface of the core member is provided with a cross-sectional shape that is constant along the length of said core member to facilitate slidably inserting the pre-assembled hydraulic sub-assembly into the pre-assembled electrical sub-assembly.

10. A method of assembling an electromagnetically actuatable disc-type valve for metering the supply of fluid, the valve having an armature and a fluid filter, the method comprising the steps of:

inserting the fluid filter into a core passage defined in the valve;

thereafter inserting a calibration slide into the core passage of the valve so that said filter is disposed between said calibration slide and the armature;

thereafter using said calibration slide to set the biasing tension on the armature; and wherein said step of inserting the fluid filter comprises disposing the filter within the core passage so as to be in position within the core passage relative to the calibration device to intercept any debris caused by said steps of inserting the calibration device and setting the biasing tension on the armature.

11. A method as in claim 10, further comprising the step of:

thereafter flow checking the valve.

* * * * *